(12) United States Patent
Saito

(10) Patent No.: US 11,240,541 B2
(45) Date of Patent: Feb. 1, 2022

(54) VIRTUAL PROCESSING SERVER, CONTROL METHOD OF VIRTUAL PROCESSING SERVER, CONTENT DISTRIBUTION SYSTEM, AND APPLICATION PROGRAM FOR TERMINAL DEVICE

(71) Applicant: DWANGO Co., Ltd., Tokyo (JP)

(72) Inventor: Hiroaki Saito, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/499,204

(22) PCT Filed: Mar. 16, 2018

(86) PCT No.: PCT/JP2018/010425
§ 371 (c)(1),
(2) Date: Sep. 27, 2019

(87) PCT Pub. No.: WO2018/180586
PCT Pub. Date: Oct. 4, 2018

(65) Prior Publication Data
US 2020/0351527 A1 Nov. 5, 2020

(30) Foreign Application Priority Data
Mar. 31, 2017 (JP) .............................. JP2017-071611

(51) Int. Cl.
*H04N 21/4788* (2011.01)
*H04N 21/237* (2011.01)
(Continued)

(52) U.S. Cl.
CPC ......... *H04N 21/237* (2013.01); *H04N 21/235* (2013.01); *H04N 21/435* (2013.01); *H04N 21/4788* (2013.01)

(58) Field of Classification Search
None
See application file for complete search history.

(56) References Cited

U.S. PATENT DOCUMENTS

| 9,118,886 B2 * | 8/2015 | Wang | ................. H04N 21/6587 |
| 10,019,652 B2 * | 7/2018 | Wang | ...................... G06T 19/00 |

(Continued)

FOREIGN PATENT DOCUMENTS

| JP | 2008217369 A | 9/2008 |
| JP | 2014138223 A | 7/2014 |

(Continued)

OTHER PUBLICATIONS

English Translation of Notice of Reasons for Refusal received in JP Application No. 2017-071611 dated Jun. 22, 2017.

(Continued)

*Primary Examiner* — William J Kim
(74) *Attorney, Agent, or Firm* — Dorsey & Whitney LLP

(57) ABSTRACT

The present invention provides: a virtual processing server with which comments are randomly posted to the content which has a small number of viewers and comment posts, thereby liven up the content, a control method for a virtual processing server, a content delivery system, and an application program for a terminal device.

A virtual processing server 3 in the content delivery system is provided with: a content delivery server 1 which provides a content delivery service to a terminal device 5; a comment delivery server 2 which delivers a comment posted to a content; and a virtual processing server 3 which virtually executes processing to the content, wherein the server accesses to the content, and is provided with: an execution control unit 31 which virtually executes processing; and a first condition determination unit 31 which determines a predetermined first condition for executing the access, (Continued)

wherein the execution control unit 31 executes the access to the content when it is determined that the predetermined first condition has been satisfied.

19 Claims, 7 Drawing Sheets

(51) Int. Cl.
*H04N 21/235* (2011.01)
*H04N 21/435* (2011.01)

(56) References Cited

U.S. PATENT DOCUMENTS

| | | | |
|---|---|---|---|
| 10,104,403 B1* | 10/2018 | Ekambaram | H04N 21/8126 |
| 2009/0297118 A1* | 12/2009 | Fink | G06F 3/0482 |
| | | | 386/278 |
| 2010/0043020 A1* | 2/2010 | Basso | H04N 21/26258 |
| | | | 725/1 |
| 2010/0100904 A1* | 4/2010 | Kawakami | H04N 21/8133 |
| | | | 725/37 |
| 2010/0165396 A1* | 7/2010 | Yamaguchi | H04N 21/454 |
| | | | 358/1.15 |
| 2011/0179452 A1* | 7/2011 | Dunker | H04N 21/2393 |
| | | | 725/53 |
| 2013/0097476 A1* | 4/2013 | Kuroda | G06F 40/169 |
| | | | 715/201 |
| 2014/0168517 A1* | 6/2014 | Petajan | G06K 9/00724 |
| | | | 348/576 |
| 2015/0139610 A1* | 5/2015 | Syed | G11B 27/11 |
| | | | 386/241 |
| 2017/0228600 A1* | 8/2017 | Syed | G06K 9/325 |
| 2018/0068019 A1* | 3/2018 | Novikoff | G06F 16/783 |
| 2018/0160180 A1* | 6/2018 | Kedenburg, III | H04N 21/4758 |
| 2020/0153915 A1* | 5/2020 | Jain | H04L 67/22 |

FOREIGN PATENT DOCUMENTS

| | | |
|---|---|---|
| JP | 2015220610 A | 12/2015 |
| JP | 2017041892 A | 2/2017 |
| WO | 2016001996 A1 | 1/2016 |

OTHER PUBLICATIONS

International Search Report and Written Opinion received in PCT/JP2018/010425 dated Apr. 10, 2018 (Engl. translation of ISR only).

* cited by examiner

VIRTUAL PROCESSING SERVER, CONTROL METHOD OF VIRTUAL PROCESSING SERVER, CONTENT DISTRIBUTION SYSTEM, AND APPLICATION PROGRAM FOR TERMINAL DEVICE

RELATED APPLICATIONS

This application is a U.S. National Stage filing under 35 U.S.C. § 371 of PCT Application No. PCT/JP2018/010425, filed Mar. 16, 2018 which claims priority to Japanese Application No. 2017-071611 filed Mar. 31, 2017, which applications are incorporated herein by reference in their entirety, for any purpose.

TECHNICAL FIELD

The present invention relates to a virtual processing server, a control method for a virtual processing server, a content delivery system, and an application program for a terminal device.

BACKGROUND TECHNOLOGY

Generally, in the video delivery services in which the posting of comments by viewers is possible, if a viewer posts a comment at a specific playback timing of the video data while it is being played, the comments are displayed on the terminal devices of other viewers who are viewing the same video data corresponding to the playback timing when such posting is made. By such function, viewers can share their thoughts and feelings with other viewers in synchronization with the progress situation (the content) of the video data. Additionally, based on a copious amount of comments posted at a specific playback timing of the video data, viewers can experience the heightened sensation in unison with plural viewers. This way, the joy of viewing videos can be further enhanced.

However, for example, when the video data that was uploaded to the video delivery server was uploaded relatively recently, the number of comments posted by viewers is small. Thus, the viewers, even if they watch the video data, can neither become more excited because the number of the posted comments is small, nor can they experience the pleasure that is made possible by the function of the comment posting. In other words, in the conventional delivery system, even for the same content of video data, there were situations in which differences arose in the degree of the pleasure that the viewers can experience between the cases where viewers watch video data with a small number of posted comments and where fulfilling amount of comments are posted to the video data. Furthermore, if the number of comments posted to a certain video data was small, there was also a problem that it was further not easy for the number of comment posts to increase because of the situations such that a viewer who was going to watch the video data stops watching it, and that they are not motivated to post additional comments, etc.

Thus, as described in Patent Literature 1, a comment display device is proposed that can enliven and entertain the viewers of the video, even for the videos with a small number of comment posts.

In the comment display device of Patent Literature 1, pseudo comments are generated by the program, and comments are posted to videos with a small number of comment posts, based on the viewers' comments posted to the videos with a small numbers of comment posts or the videos related to such videos.

PRIOR ART LITERATURE

Patent Literature

Patent literature 1: Japanese Patent Application Publication No. 2015-220610

SUMMARY OF THE INVENTION

Problems to be Solved by the Invention

As a service similar to that of the video delivery described above, services are provided for the delivery of content. However, there have been problems in such content-delivery services in which comments were not smoothly added to unpopular programs or to the programs which are still in early stage after the start.

However, in the content-delivery services, it was difficult to adopt the technology of Patent Literature 1. In other words, as described in Patent Literature 1, pseudo comments are generated based on the comments posted to the video with a small numbers of comment posts, however, it is difficult to collect comments to begin with in unpopular programs or programs that have just started delivery, therefore it is not possible to generate pseudo comments based on the posted comments.

Additionally, in the video delivery service it is possible to generate pseudo comments based on the comments posted to related videos, as there exists a concept of related videos. However, in the service of content delivery, there is no concept equivalent to the related videos as noted above, therefore it is not possible to generate pseudo comments based on the comments posted to the related videos.

Consequently, there are cases where a distributor who intended to deliver a program quits the delivery of the program because the reaction through comment posts is low. Additionally, a viewer may take into consideration whether many comments are posted to the program, as the criteria for choosing a video to watch. The fact that there are many comments posted can mean that the program is expected to be lively and interesting.

In the first place, if comment posts are few, or no comments are posted to the program, a viewer who has started to watch it only for a trial purpose may quit viewing it and switch to other programs.

Furthermore, if only pseudo comments are automatically generated as in Patent Literature 1, it drives up the number of comments only mechanically, but it cannot enhance the entertainment quality of the program.

Thus, an object of the present invention is to provide an application program that can generate random posting of comments to the content with few viewers and few comment posts and thereby enliven the content, a terminal device control method, a terminal device, and a server.

Means for Solving the Problem

In order to solve the problems, one aspect of a virtual processing server of the present invention, wherein the virtual processing server in a content delivery system includes: a content delivery server which provides a content delivery service to a terminal device; a comment delivery server which delivers comments posted to the content; and a virtual processing server which virtually executes processing to the content, wherein the virtual processing server includes: an execution control unit which accesses to the content and virtually executes processing; and a first condition determination unit which determines a predetermined first condition for executing the access, wherein when the predetermined first condition is determined as satisfied, the execution control unit executes the access to the content.

In the description of the present invention, "content" is the overall concept including not only the programs in which distributors deliver, in real time, the image that they shot with their camera, but also the programs in which videos recorded in a repeatedly playable manner are delivered as being played. In the description, "comment" is the overall concept including not only the comments in text data, but also stamps, link information, sound data and related items. In the description, "access" is the overall concept including the states in which a virtual processing server has established the communication with a content delivery server in regard to the content, and examples include such manners called "entrance" or "participation." In the description, "virtually execute processing" is the concept that is contrasted against the processing by actual users, and, examples include virtual execution of comment posting processing to the content, virtual execution of initiation processing of a predetermined event in the content, and others. In the description, "predetermined first condition" is the overall concept including elapsed time, degree of involvement by distributors or users, or whether there are requests from distributors, etc.

According to the aspect, the first condition determination unit of the virtual processing server determines the predetermined first condition for executing access to the content that the content delivery server delivers. The execution control unit of the virtual processing server executes access to the content when the predetermined first condition is determined as satisfied. Therefore, even if the content delivery has just been started and the content has a small number of viewers and has received only a few comments, access is executed by the virtual processing server when the predetermined first condition is satisfied. Access by the virtual processing server is not executed for all the content which has a small number of viewers or a small number of comments, but it is executed when the predetermined first condition is satisfied. Therefore, rarity value is added due to the fact that the access was executed by the virtual processing server, thereby it is expected to draw the attention of viewers and the probability can be enhanced for the content to be enlivened. Consequently, the motivation of the content distributor can be improved for continuing delivering of the content.

Another feature of the aspect of the present invention is that the execution control unit executes access to the content by sending a predetermined command to the content delivery server. According to this aspect, as the access to the content is executed by sending the predetermined command to the content delivery server from the execution control unit of the virtual processing server, it is possible to realize the involvement in the content by the virtual processing server based on the predetermined procedures.

Another feature of the aspect of the present invention is that [the virtual processing server] further includes a second condition determination unit Which determines a predetermined second condition for executing at least one of processing that virtually posts a comment to the content and processing that virtually initiates a predetermined event in the content, and when the predetermined second condition is determined as satisfied, the execution control unit executes at least one of processing that virtually posts a comment to the content and processing that virtually initiates a predetermined event in the content.

In the description, "predetermined second condition" is the overall concept including elapsed time, degree of involvement by distributors or viewers, or whether there are requests from the distributors, etc.

According to the aspect, the second condition determination unit of the virtual processing server determines the predetermined second condition. The execution control unit executes at least one of processing that virtually posts a comment to the content and processing that virtually initiates a predetermined event in the content, when the predetermined second condition is determined as satisfied. Therefore, even for the content that has a small number of viewers and has received only a few comments, at least one of processing that virtually posts a comment to the content and processing that virtually initiates a predetermined event in the content is executed by the execution control unit of the virtual processing server, thereby the probability can be enhanced for the content to be enlivened. Consequently, the motivation of the content distributor can be improved for continuing delivering of the content. Furthermore, processing by the virtual processing server that virtually posts a comment or processing that virtually initiates a predetermined event is not executed for all the content which has a small number of viewers or a small number of comments, but it is executed when the predetermined second condition has been satisfied. Therefore, rarity value is added due to the fact that the processing has been executed by the virtual processing server, thereby it is expected to draw the attention of viewers and the probability can be enhanced for the content to be enlivened.

Another feature of the aspect of the present invention is that the execution control unit executes virtual processing of comment postings to the content by sending the predetermined command to the comment delivery server, and virtually initiates a predetermined event in the content by sending the predetermined command to the content delivery server. According to this aspect, because virtual processing of comment postings to the content or virtual initiation of the predetermined event in the content is executed by sending the predetermined command to the content delivery server from the execution control unit of the virtual processing server, involvement to the content by the virtual processing server is realized based on the predetermined procedures.

Another feature of the aspect of the present invention is that the predetermined first condition and the predetermined second condition at least include the fact that the degree of involvement in the content by the distributor of the content or the users who accessed to the content is equal to or less than the predetermined value. According to this aspect, when the degree of involvement in the content by the distributor of the content or the users who accessed to the content is equal to or less than the predetermined value, the virtual processing server determines that the predetermined first condition and the predetermined second condition are satisfied, and performs the aforementioned processing. Accordingly, it is possible to quantitatively evaluate the content which lacks liveliness and properly enhance the probability to liven up the content.

Another feature of the aspect of the present invention is that the degree of involvement includes at least any one of: the degree of change in at least one of the image and the sound of the content, the number of viewers of the content, the number of comment posts to the content, and the elapsed time from the predetermined reference time. According to this aspect, the virtual processing server determines the degree of involvement based on any one of the following: the degree of change in at least one of the image and the sound of the content, the number of viewers of the content, the number of comment posts to the content, and the elapsed time from the predetermined reference time. Accordingly, it is possible to quantitatively evaluate the content which lacks liveliness and properly enhance the probability to liven up the content.

In order to solve the problems, one aspect of a control method for a virtual processing server of the present invention is that a control method for the virtual processing server in the content delivery system includes: a content delivery server which provides a delivery service of content to a terminal device; a comment delivery server which delivers comments posted to the content; and a virtual processing server which virtually executes the processing to the content, the method includes:

determining a predetermined first condition for executing access to the content; and executing the access to the content when the predetermined first condition is determined as satisfied.

According to the aspect, determination is performed on the predetermined first condition for the virtual processing server to execute access to the content which the content delivery server delivers. When the predetermined first condition is determined as satisfied, access by the virtual processing server is executed to the content. Thus, the access is executed by the virtual processing server when the predetermined first condition is satisfied, even if the content delivery has just been started and the content has a small number of viewers and has received only a few comments. Access by the virtual processing server is not executed for all the content which has a small number of viewers or a small number of comments, but it is executed when the predetermined first is satisfied. Therefore, rarity value is added due to the fact that access was executed by the virtual processing server, thereby it is expected to draw the attention of viewers and the probability can be enhanced for the content to be enlivened. Consequently, the motivation of the content distributor can be improved for continuing delivering the content.

In order to solve the problems, one aspect of the content delivery system of the present invention is that a content delivery system includes: a terminal device for providing content or for viewing the content; a content delivery server which provides a content delivery service to the terminal device; a comment delivery server which delivers comments posted to the content; and a virtual processing server which virtually executes processing to the content, wherein the virtual processing server includes: an execution control unit which accesses to the content and virtually executes processing; and a first condition determination unit which determines a predetermined first condition for executing access, wherein the execution control unit executes the access to the content, when the predetermined first condition is determined as satisfied, wherein the terminal device includes: a content display unit Which displays the content; an access status display unit which displays the access status to the content; and an information display unit which displays the posted comment to the content, wherein the access status display unit displays the access executed by the virtual processing server in a distinguishable manner from access executed by a viewer of the content; and the information display unit displays the posting of comments by the virtual processing server in a distinguishable manner from other postings.

According to the aspect, the first condition determination unit of the virtual processing server determines the predetermined first condition for executing access to the content that the content delivery server delivers. The execution control unit of the virtual processing server executes access to the content when the predetermined first condition is determined as satisfied. The access status display unit of the terminal device displays in a distinguishable manner that access was executed by the virtual processing server from the fact that access was executed by the viewers to the content. Additionally, the information display unit of the terminal device displays the posting of comments by the virtual processing server distinguishably from other postings. Therefore, even if the content delivery has just been started and the content has a small number of viewers and has received only a few comments, the distributor who delivers the content using a terminal device or the viewers who view the content using a terminal device can infallibly recognize that access was executed by the virtual processing server, when the predetermined first condition is satisfied. Consequently, it is expected to draw attention of viewers who have realized that access with high rarity was made by the virtual processing server, thereby the probability can be enhanced for the content to be enlivened. Additionally, the motivation of the distributors can be improved for continuing delivering of the content. Furthermore, as the comment posting by the virtual processing server is displayed in a distinguishable manner from other postings on the terminal device, it is expected to draw attention of the viewers who have realized that comment with high rarity was posted by the virtual processing server, thereby the probability can be enhanced for the content to be enlivened. Consequently, the motivation of the content distributors can be improved for continuing delivering of the content.

In order to solve the problems, one aspect of the application program of the terminal device of the present invention is that an application program for a terminal device having communication function with a content delivery server which provides a delivery service of content; a comment delivery server which delivers comments posted to the content; and a virtual processing server which virtually executes processing to the content, wherein the application program for a terminal device enables a computer of the terminal device to function as a content display unit which displays the content; an access status display unit which displays the access status to the content; and an information display unit which displays the comment posted to the content, wherein the access status display unit displays the fact that access was executed by the virtual processing server in a distinguishable manner from the fact that access was executed by the viewer of the content.

According to the aspect, the access status display unit of the terminal device displays in a distinguishable manner that access was executed by the virtual processing server from the fact that access was executed by the viewers to the content. Therefore, even if the content delivery has just been started and the content has a small number of viewers and has received only a few comments, the distributor who delivers the content using a terminal device or the viewers who view the content using a terminal device can infallibly recognize that access was executed by the virtual processing server. Consequently, it is expected to draw attention of viewers who have realized that access with high rarity was made by the virtual processing server, thereby the probability can be enhanced for the content to be enlivened. Furthermore, the motivation of the content distributor can be improved for continuing delivering of the content.

Another feather of the aspect of the present invention is that the information display unit displays the posting of comments to the content by the virtual processing server in a distinguishable manner from other postings. According to this aspect, as the comment posting by the virtual processing server is displayed in a distinguishable manner from other postings on the terminal device, it is expected to draw attention of the viewers who have realized that comment with high rarity was posted by the virtual processing server, thereby the probability can be enhanced for the content to be enlivened. Consequently, the motivation of the content distributor can be improved for continuing delivering of the content.

Effect of the Invention

According to the present invention, even if the content delivery has just been started, the content has a small number of viewers or has received only a few comments, or both of them are the cases, access is executed to the content by a virtual processing server, thereby the probability can be enhanced for the content to be enlivened. Furthermore, the motivation of the distributors can be improved for continuing delivering of the content.

BEST MODE FOR CARRYING OUT THE INVENTION

Figure 1:
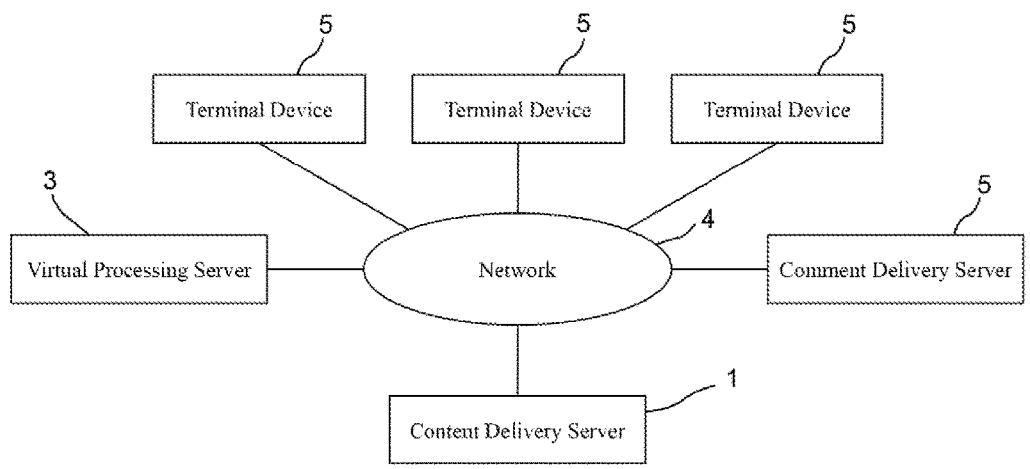
FIG. 1 is a schematic diagram showing a content delivery system of one embodiment of the present invention.
Figure 2:
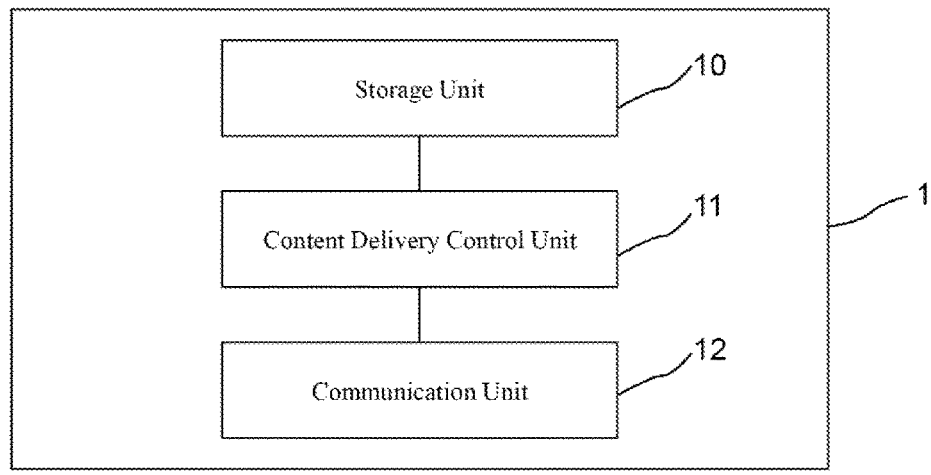
FIG. 2 is a schematic block diagram showing the configuration of a content delivery server in one embodiment.
Figure 3:
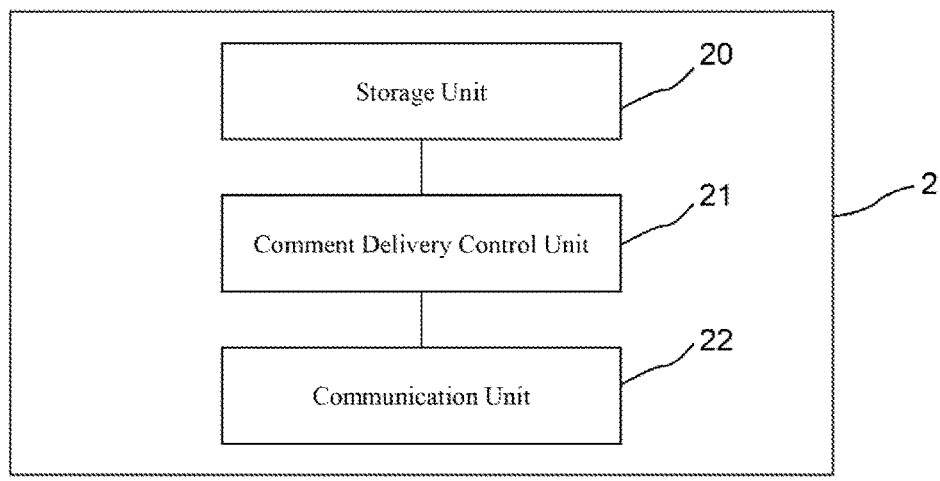
FIG. 3 is a schematic block diagram showing the configuration of a terminal device in one embodiment.
Figure 4:
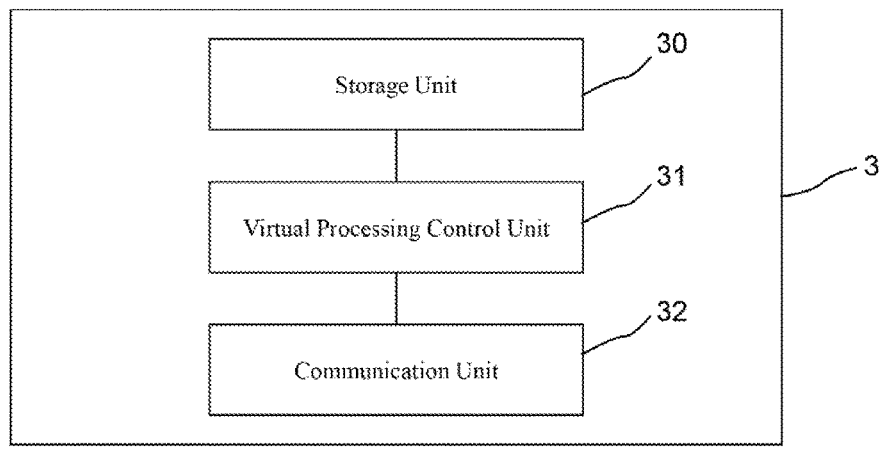
FIG. 4 is a schematic block diagram showing the configuration of a virtual processing server in one embodiment.
Figure 5:
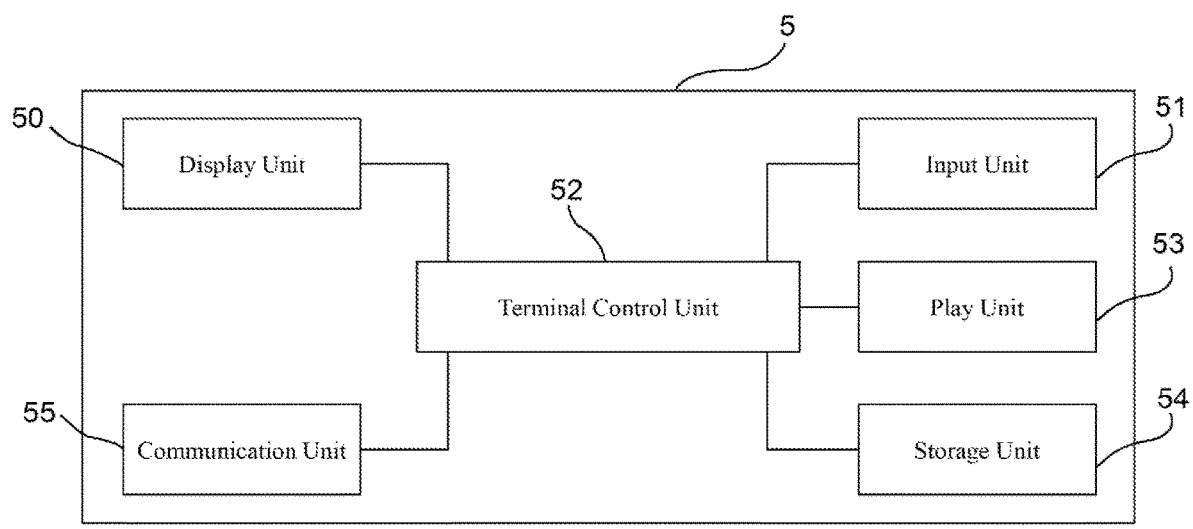
FIG. 5 is a schematic block diagram showing the configuration of a terminal device in one embodiment.

Hereinafter, one embodiment of the present invention is explained with reference to the drawings. FIG. 1 is a schematic diagram showing the content delivery system of one embodiment of the present invention. FIG. 2 is a schematic block diagram showing the configuration of the content delivery server in one embodiment. FIG. 3 is a schematic block diagram showing the configuration of the comment delivery server in one embodiment. FIG. 4 is a schematic block diagram showing the configuration of the virtual processing server in one embodiment. FIG. 5 is a schematic block diagram showing the configuration of the terminal device in one embodiment.

The Content Delivery System

As shown in FIG. 1, the content delivery system in one embodiment of the present invention is provided with a content delivery server 1, a comment delivery server 2, a virtual processing server 3, a network 4 such as the Internet, etc., and terminal devices 5. The terminal devices 5 include the terminal device 5 of the distributor who delivers the content and the terminal device 5 of the viewer who views the content.

As shown in FIG. 2, the content delivery server 1 is provided with a storage unit 10, a content delivery control unit 11 and a communication unit 12. The storage unit 10 is configured, for example, with HDD (Hard Disk Drive) and others. In the storage unit 10, the program for the content delivery server 1 of the present invention is stored. The communication unit 12 is the interface for data communication with the use of the network 4. In this embodiment, as an example, the Internet is used as the network 4, and the communication unit 12 is the interface for data communication via the Internet. The content delivery server 1 is capable of communicating with the terminal device 5, the comment delivery server 2 and the virtual processing server 3 through the network 4.

The content delivery control unit 11 is configured with CPU, etc., and performs control related to content delivery through running the program stored in the storage unit 10. The content delivery control unit 11 receives a user ID of the distributor and a delivery request for the content from the terminal device 5 of the distributor who delivers the content. When receiving the video data of the content and the metadata of the video data from the distributor's terminal device 5, the content delivery server 1 attaches the content ID to the content, and delivers the content to the distributor's terminal device 5. Content delivery, for example, is performed via streaming. Additionally, the content includes not only the programs in which the distributors deliver, in real time, the images which they shot with their camera, but also the programs in which videos recorded in a repeatedly playable manner are delivered as being played. Additionally, the metadata of the video data is a letter string (video tag) showing the classification of the video data.

The content delivery control unit 11 measures and records the elapsed time since the start of content delivery and the elapsed time from the predetermined reference time for each of the content. Additionally, the content delivery control unit 11 measures and records the number of viewers for each of the content. Furthermore, the content delivery control unit 11 measures and records the degree of the change in at least one of the image and the sound in the content for each of the content.

The content delivery control unit 11 presents webpage (hereinafter referred to as "webpage for content selection") so that the viewers can select the content. The webpage for content selection includes the URL (Uniform Resource Locater) for viewing the content and the metadata of the video data of the content.

When the viewer makes the webpage for content selection displayed on the terminal device 5, and clicks to select the desired content, a request for viewing the content is sent from the viewer's terminal device 5 to the content delivery server 1. The content delivery control unit 11 receives the request for viewing from the terminal device 5, sends the content ID and delivers the content to the terminal device 5.

Additionally, the content delivery control unit 11 measures and records the number of viewers based on the request for viewing.

When there is an inquiry from the virtual processing server 3 for each of the content about the elapsed time since the start of delivery, the elapsed time from the predetermined reference time, the number of viewers, and the degree of the change, the content delivery control unit 11 sends the answers about these pieces of information to the virtual processing server 3.

The content delivery control unit 11 reports to the terminal device 5 that there was access to the content from the virtual processing server 3, when it receives a command that indicates the access from the virtual processing server 3.

In the content delivery system of this embodiment, it is configured in such a way that the distributor and the viewer are able to post comments to the content by entering the comments to the terminal device 5. Additionally, in the content delivery system of this embodiment, it is configured in such a way that comments are able to be virtually posted from the virtual processing server as well. In this embodiment, posting of the comments is performed to the comment delivery server 2, and the posted comments are delivered by the comment delivery server 2.

The comment delivery server 2, as shown in FIG. 3, is provided with a storage unit 20, a comment delivery control unit 21 and a communication unit 22. The storage unit 20 is configured with, for example, HDD (Hard Disk Drive), etc. In the storage unit 20, the program for the comment delivery server 2 is stored. The comment delivery control unit 21 is configured with CPU, etc., and receives comments and the data related to the comments from the terminal device 5, and delivers the comments and the data related to the comments to the terminal device 5 for each of the content by running the program stored in the storage unit 20. Additionally, the comment delivery control unit 21 receives a command related to the comments from the virtual processing server 3, and delivers the comments and the data related to the comments based on the command to the terminal device 5 for each of the content.

The comment delivery control unit 21 measures and records the number of comment posts for each of the content. The number of comment posts includes the comments based on the command from the virtual processing server 3. The comment delivery control unit 21 sends in return the number of comment posts to the terminal device 5 or the virtual processing server 3 for each of the content, when there is an inquiry about the number of comment posts from the terminal device 5 or the virtual processing server 3.

The virtual processing server 3, as shown in FIG. 4, is provided with a storage unit 30, a virtual processing control unit 31 and a communication unit 32. The storage unit 30 is configured with, for example, HDD (Hard Disk Drive) and others. In the storage unit 30, the program for the virtual processing server 3 is stored.

The communication unit 55 interfaces with the network 4 for data communication and is controlled by the virtual processing control unit 31. In this embodiment, as an example, the Internet is used as the network 4, and the communication unit 32 is the interface for the data communication through the Internet. The virtual processing server 3 is capable of communicating with the content delivery server 1 and the comment delivery server 2.

The virtual processing control unit 31 is configured with a CPU, etc., and it functions as an execution control unit, a first condition determination unit and a second condition determination unit by running the program stored in the storage unit 30. The virtual processing control unit 31 performs inquiries to the content delivery server 1 about the elapsed time since the start of delivery, the elapsed time from the predetermined reference time, the number of viewers, and the degree of the change for each of the content. The virtual processing control unit 31 performs inquiries to the comment delivery server 2 about the number of comment posts for each of the content.

The virtual processing control unit 31 receives the answers from the content delivery server 1 about the elapsed time since the start of delivery, the elapsed time from the predetermined reference time, the number of viewers, and the degree of the change for each of the content, and receives the answers from the comment delivery server 2 about the number of comment posts for each of the content. The virtual processing control unit 31 determines whether the predetermined conditions are satisfied based on the received answers for each of the content. The virtual processing control unit 31 sends to the content delivery server 1 a command indicating the access to the content that satisfies the predetermined conditions. Additionally, the virtual processing control unit 31 virtually performs processing to the content that satisfies the predetermined conditions. Examples of the processing include virtual processing of comment posting to the content, or processing for virtual initiation of the predetermined event in the content, etc. In this embodiment, as an example, explanations are given on the virtual processing of comment posting to the content.

As shown in FIG. 5, the terminal device 5 is provided with a display unit 50, an input unit 51, a terminal control unit 52, a play unit 53, a storage unit 54, and a communication unit 55. The terminal unit 5 is a terminal device which has the function capable of communicating through the network 4 with the content delivery server 1 and the comment delivery server 2. The terminal device 5 can be, for example, a cellular phone, a smart phone, a mobile terminal such as information terminal device, a PC, a game machine, a television set, etc. The display unit 50 is configured with a liquid crystal display of a cellular phone, a smart phone, a mobile terminal such as information terminal device, a PC, a game machine, a television set, etc. The display unit 50 may be, for example, a HMI) (Head Mounted Display) of VR (Virtual Reality), MR (Mixed Reality), AR (Augmented Reality), etc. Additionally, smart glasses may be used as the display unit 50. A projector may also be used as the display unit 50.

By using the input unit 51, the user, who can be a distributor or a viewer, inputs operational instructions, comments, etc. The input unit 51 is configured with, for example, a touch panel integrated in the display unit 50, a keyboard, etc. The input unit 51 also includes a microphone for sound input. Furthermore, in this embodiment the input unit 51 also includes a camera.

In the terminal device 5, the application program of the present invention is downloaded and installed in advance from the application program delivery server whose illustration is omitted here. The terminal control unit 52 controls the display unit 50, the input unit 51, the play unit 53, the storage unit 54, and the communication unit 55. The terminal control unit 52 receives the video data of the content delivered from the content delivery server 1 and makes the display unit 50 display the data. Additionally, the terminal control unit 52 receives the video data of the content delivered from the content delivery server 1 and makes the play unit 53 play the data. Furthermore, the terminal control unit 52 receives the text data, etc. of the comments delivered from the comment delivery server 2 and makes the display unit 50 display the data.

The play unit 53 is configured with an amplifier, a speaker, etc., and plays the video data of the content in accordance with directives from the terminal control unit 52. The storage unit 54 stores the application program, the data delivered from the content delivery server 1 and the data delivered from the comment delivery server 2.

The communication unit 55 interfaces with the network 4 for data communication and is controlled by the terminal control unit 52. In this embodiment, as an example, the Internet is used for the network 4, and consequently the communication unit 55 interfaces with the Internet for data communication.

The Interface for Viewing the Content

Figure 6:
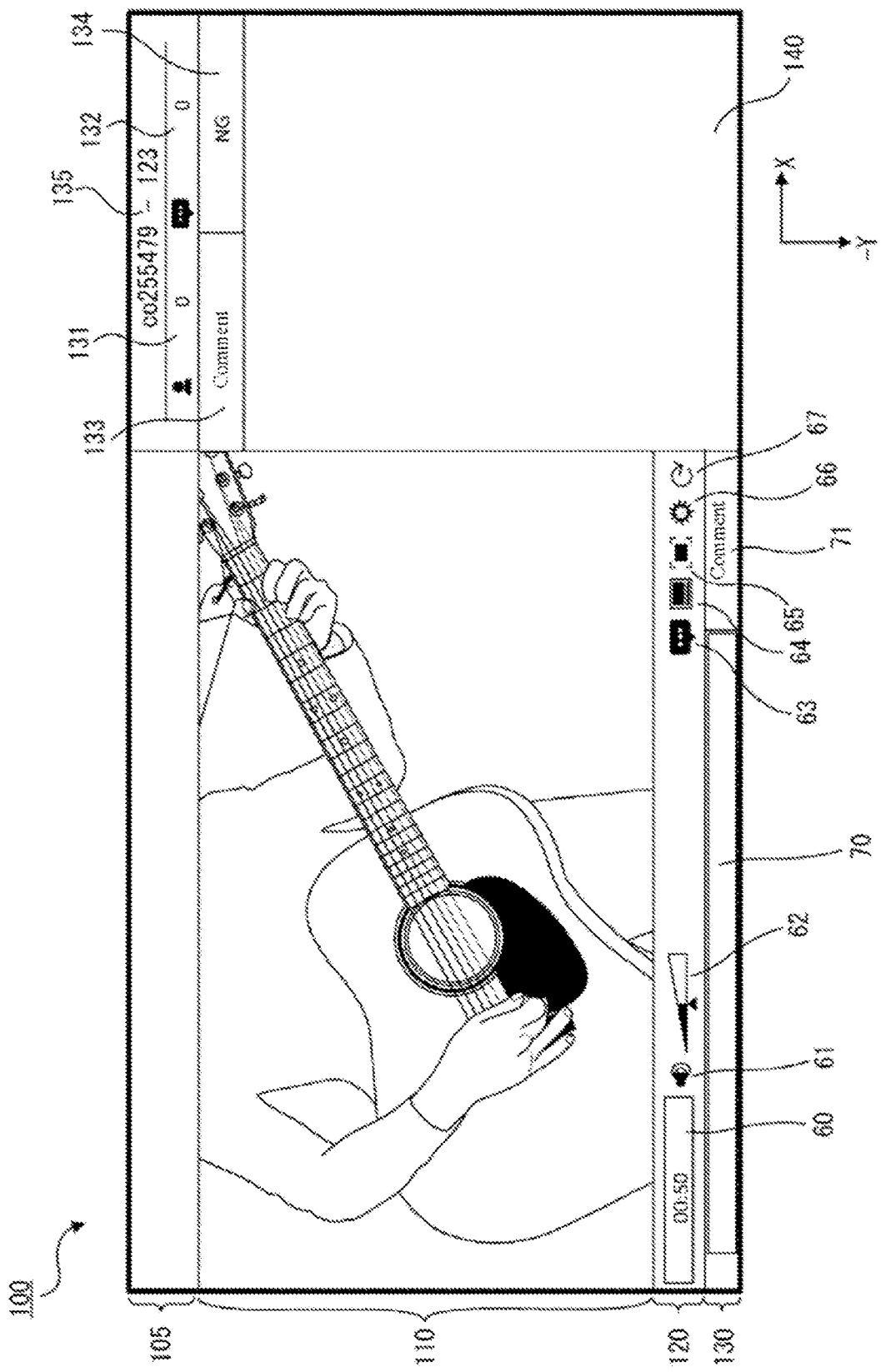
FIG. 6 is a diagram showing an example of an interface for viewing the content.
Figure 7:
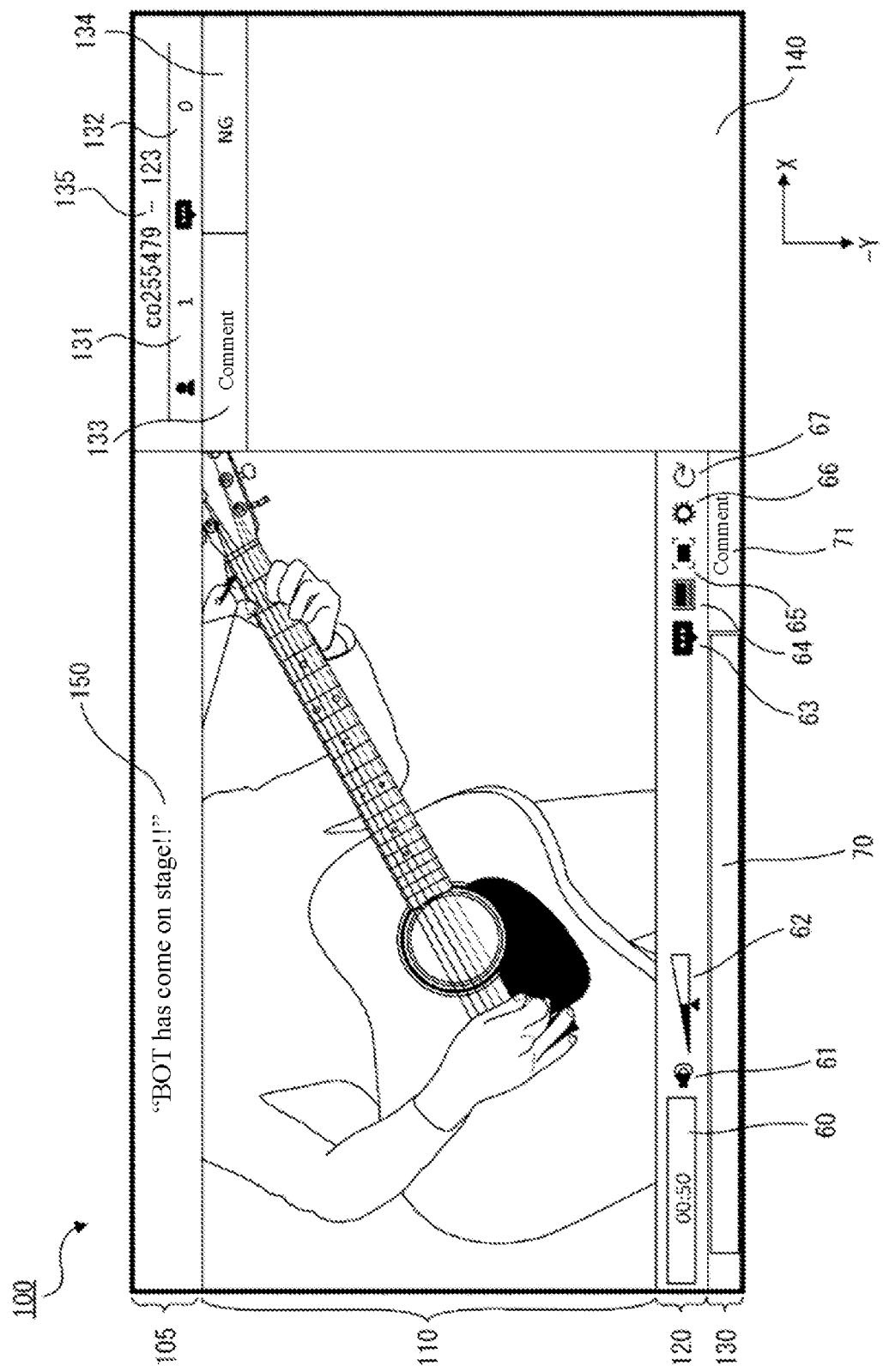
FIG. 7 is a diagram showing an example of an interface for viewing the content.
Figure 8:
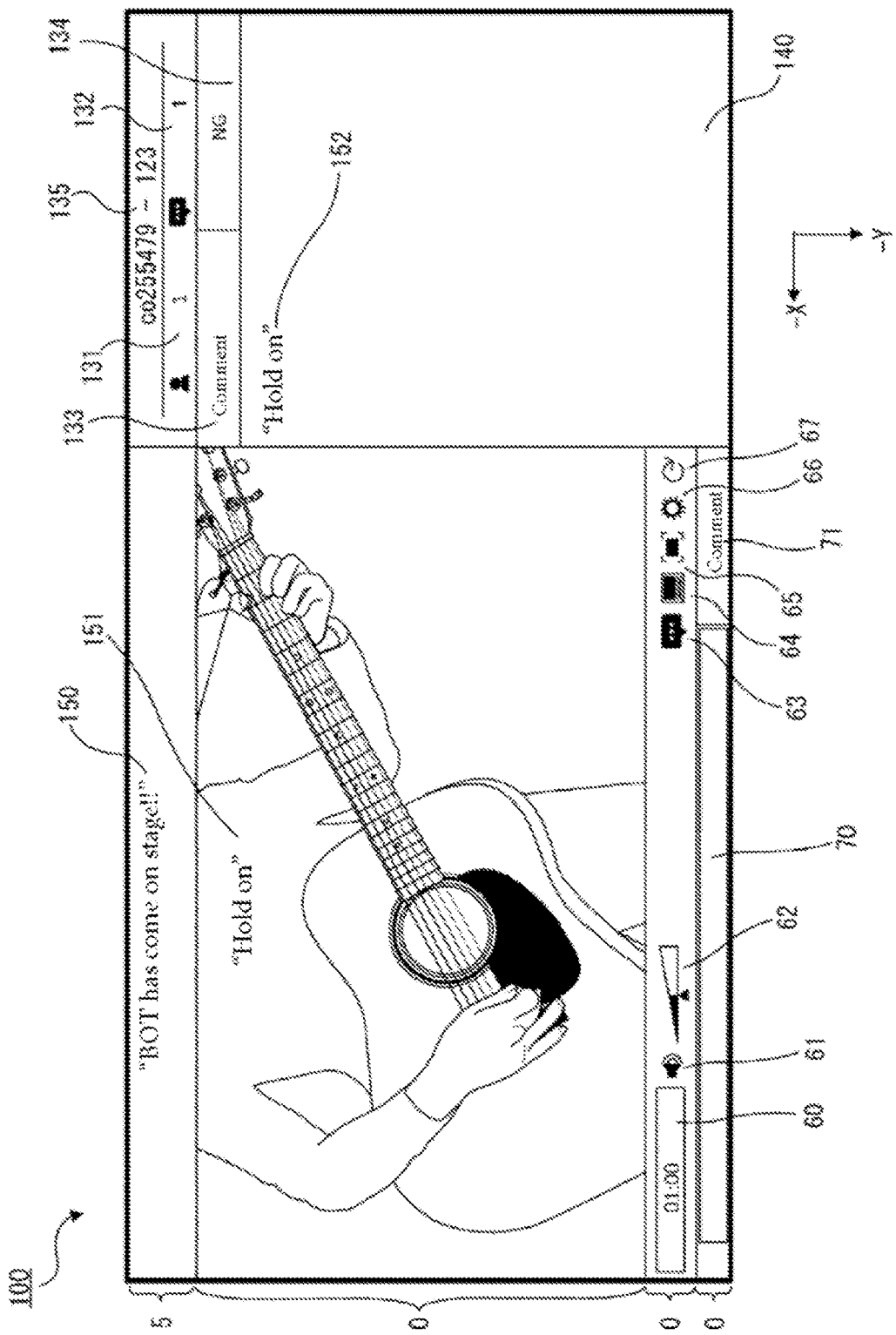
FIG. 8 is a diagram showing an example of an interface for viewing the content.
Figure 9:
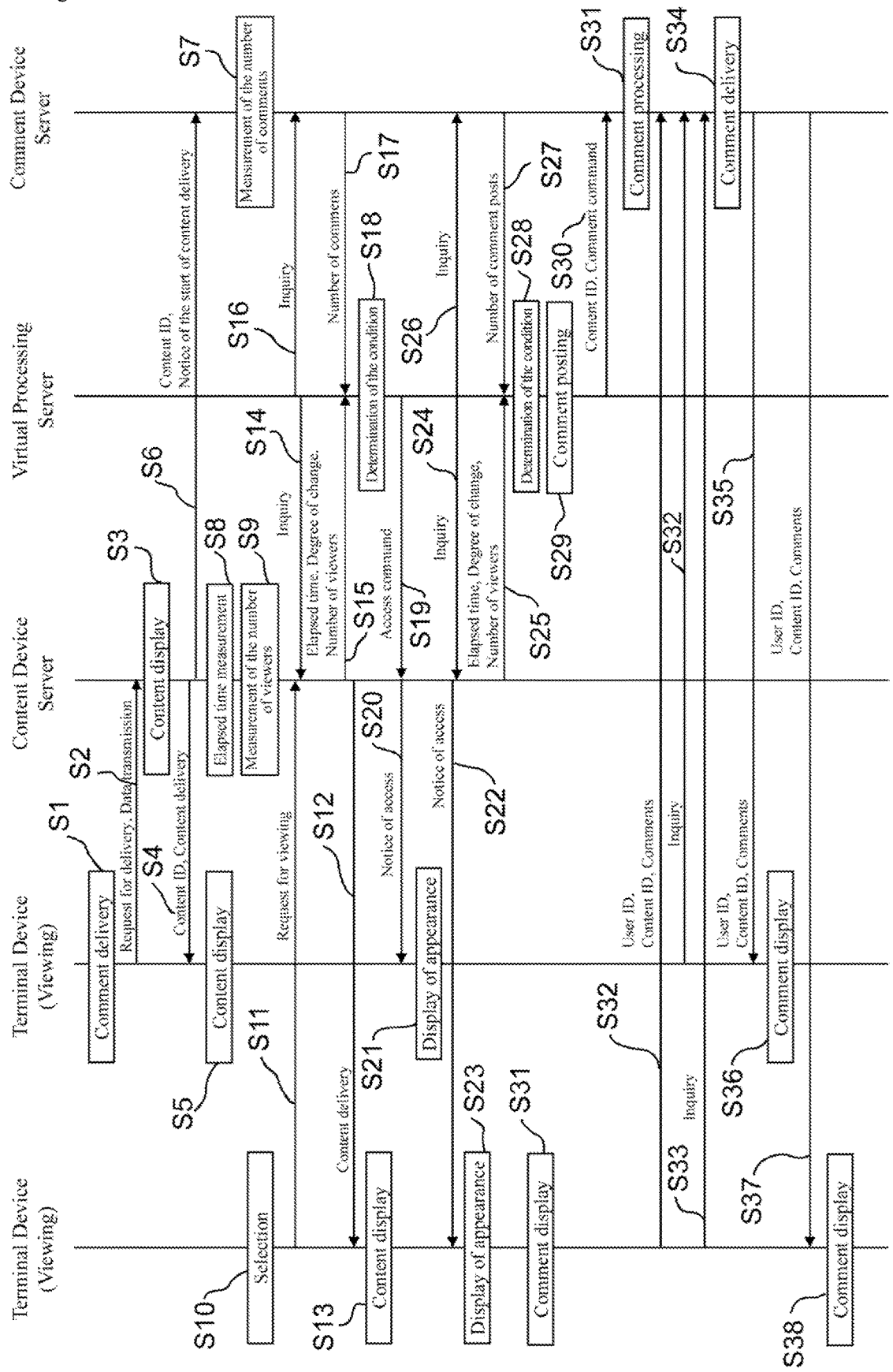
FIG. 9 is a sequence diagram showing an operation of the terminal device, the content delivery server, a comment delivery server, and the virtual processing server in the content delivery system.
Figure 10:
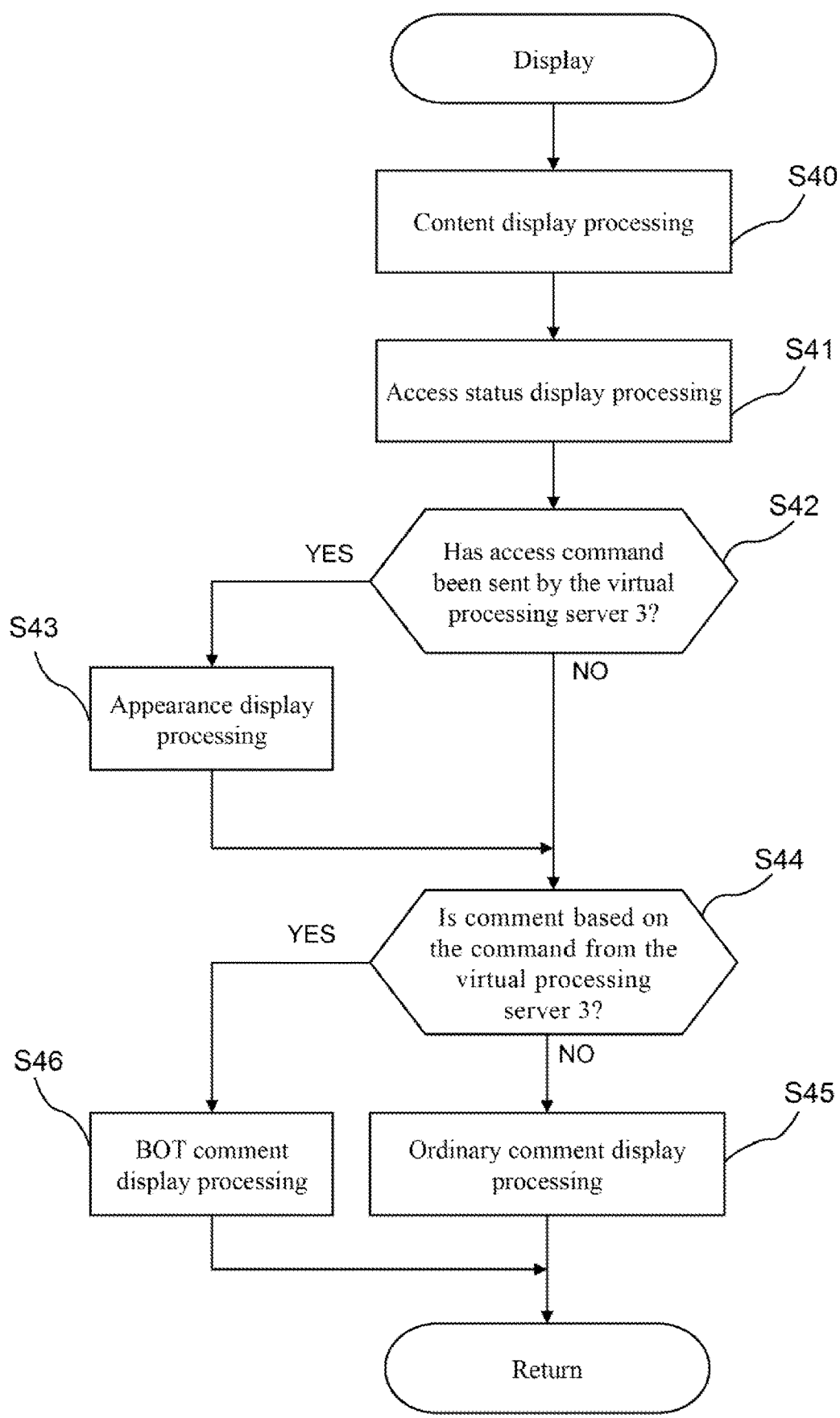
FIG. 10 is a flowchart showing an operation of the terminal device.

Next, explanations are given on the interface for viewing the content in the content delivery system of this embodiment. FIGS. 6 through 8 show an example of the interface for viewing the content. FIG. 9 is a sequence diagram showing operation of the terminal device 5, the content delivery server 1, the comment delivery server 2 and the virtual processing server 3 in the content delivery system. FIG. 10 is a flowchart showing operation of the terminal device 5.

The content-viewing interface 100 shown in FIG. 6 is an example of the interface for viewing the content when content is being viewed. The content-viewing interface 100 is displayed on the display unit 50 of the user terminal device 5.

In the content delivery system of this embodiment, an interface for content delivery is also prepared for the distributor to deliver the content, however, the explanations on the interface for content delivery are omitted in this embodiment.

As shown in FIG. 6, the content-viewing interface 100 is provided with a comment display area for the operator 105, a content display area 110, an operation area 120, a comment input field display area 130, and a comment display field 140. The comment display area for the operator 105 displays the comments by the operator of the content delivery system or the fact that there was access from the virtual processing server 3, which will be discussed later. On the content display area 110, the content is displayed. On the content display area 110, comments are also displayed when there are any comment posted.

An operation area 120 is provided with an elapsed-time display area 60, a speaker icon 61, a sound volume indicator 62, a comment display icon 63, a screen display icon 64, a full screen icon 65, a settings icon 66, and a restart icon 67.

On the elapsed-time display area 60, the elapsed time of the content is displayed. In this embodiment, as an example, it is configured in such a way that the elapsed time since the start of content delivery is measured in the content delivery server 1, the elapsed time data sent from the content delivery server 1 is received on the terminal device 5 and displayed on the elapsed-time display area 60.

The speaker icon 61 is the icon for switching the sound output on and off. The state shown in FIG. 6 indicates that the sound output is on. If the speaker icon 61 is clicked under the state shown in FIG. 6, an X mark, for example, is displayed on the speaker icon, and the sound output is switched off.

The sound volume indicator 62 is the indicator for adjusting the sound volume, and as the sound volume indicator 62 is moved toward the right in FIG. 6 (in the X direction in FIG. 6), the volume increases.

The comment display icon 63 is the icon for switching the comment display on and off. The state shown in FIG. 6 indicates that the display of the comment is on. If the speaker icon 63 is clicked under the state shown in FIG. 6, an X mark, for example, appears on the comment display icon 63, and the display on the comment display field 140 is switched off.

The screen display icon 64 is the icon for switching the display on the comment input field display area 130 on and off. The state shown in FIG. 6 indicates that the display on the comment input field display area 130 is on. If the screen display icon 64 is clicked under the state shown in FIG. 6, the shape of the screen display icon 64 changes and the display on the comment input field display area 130 is switched off.

The full screen icon 65 is the icon for switching the full screen display on and off. The state shown in FIG. 6 indicates that the full screen display is off. If the full screen icon 65 is clicked under the state shown in FIG. 6, the full screen display is turned on, and the display is switched to the full screen display.

The setting icon 66 is the icon for the setting of the comment display and others. The restart icon 67 is the icon for recovery when the image or the sound of the content stops.

The comment input field display area 130 is provided with a comment input field 70 and a post button 71. The comment input field 70 is a rectangular area for the user to enter his or her comment in the form of text, etc. The post button 71 is the button for posting the text, etc. entered in the comment input field 70.

On the right side of the content display area 110 (in the X direction in FIG. 6) a display area for order of precedence 135, a display area for the number of viewers 131, a display area for the number of comment posts 132, a comment tab 133, an NG tab 134 and a comment display field 140 are displayed.

In the display area for order of precedence 135, such information is displayed as the sequential order that the user viewed the content or the ranking where the viewer stands, when restriction or ranking is placed on the number of viewers in the content. The display area for the number of viewers 131 displays the number of viewers of the content displayed on the content display area 110. In this embodiment, as an example, it is configured in such a way that the number of the content viewers is measured in the content delivery server 1, the number of viewers data sent from the content delivery server 1 is received in the terminal device 5 and is displayed on the display area for the number of viewers 131.

In the display area for the number of comment posts 132, the number of the comment posts to the content displayed in the content display area 110 is displayed. In this embodiment, as an example, it is configured in such a way that the number of the comment posts to the content is measured in the content delivery server 1, the number of comment post data sent from the content delivery server 1 is received in the terminal device 5 and is displayed on the display area for the number of comment posts 132.

The comment tab 133 is the tab for switching the content displayed in the comment display field 140 into comments. The NG tab 134 is the tab for switching the content displayed in the comment display field 140 into the content for NG setting. The content for NG setting includes the content of such settings as turning off the display of specific comments, turning down the comments by specific users, and others.

The comment display field 140 is the area to display the posted comments. While in the content display area 110 comments are displayed in real time, in the comment display field 140 the comments posted in the past are also displayed.

FIG. 7 shows the state that displays that there was access from the virtual processing server 3. FIG. 8 shows the state that comment posting was virtually performed by the virtual processing server 3. Details of FIGS. 7 and 8 are discussed later.

Next, explanations are given with reference to the sequence diagram in FIG. 9, on the terminal device 5, the content delivery server 1, the comment delivery server 2 and the virtual processing server 3 of this embodiment. FIG. 9 is the sequence diagram showing the operation of the terminal device and the live broadcasting delivery server in the content delivery system of this embodiment. When delivering the content, the distributor launches the application program in the terminal device 5 and makes the display unit 50 display the interface for the content delivery.

The content distributor grants access to the camera and microphone on the interface for content delivery. Upon completing the predetermined setting, the content distributor clicks the delivery button displayed on the interface for the content delivery. When the delivery button is clicked, delivery processing of the content is started (S1). When the delivery button is clicked, the terminal device 5, using the application program, sends the request for the content delivery and the video data entered by the camera and microphone, to the content delivery server 1 (S2).

Upon receiving the delivery data, the content delivery control unit 11 of the content delivery server 1 starts delivery processing of the content (S3). First, the content delivery control unit 11 attaches a content ID to the content of which starts the delivery processing. Thus, the content delivery control unit 11 creates the webpage for content selection to be used for selection of the content. The webpage for content selection includes the URL for viewing the content, the metadata of the content, etc. The content delivery control unit 11 also receives the delivery data sent from the distributor's terminal device 5, and executes processing for streaming delivery.

As the interface for content delivery is displayed on the display unit 50 of the distributor's terminal device 5, the content delivery server 1 delivers the content as well as the content ID to the distributor's terminal device 5 (S4). The terminal control unit 52 in the distributor's terminal device 5 displays the content delivered to the display unit 50 (S5). Accordingly, the distributor can view the content on the terminal device 5.

When the content delivery is started, the content delivery control unit 11 of the content delivery server 1 notifies the comment delivery server 2 of the content ID of the content delivery which has been started and the fact that the content delivery has been started (S6). The comment delivery server 2, having received this notice, begins to count the number of comment posts for each of the content (S7).

When the content delivery is started, the content delivery control unit 11 of the content delivery server 1 starts to measure the elapsed time since the start of delivery (S6). The content delivery control unit 11 also starts to measure the elapsed time from the predetermined reference time after the start of delivery (S6). The content delivery control unit 11 starts to count the number of the content viewers during the delivery (S7). The content delivery control unit 11 sends the measured elapsed time and the number of viewers to the terminal device 5 that is delivering the content.

Next, explanations are given for the case where the viewers view the content through the content-viewing interface 100.

When viewing the content, the viewer launches the application program in the terminal device 5, and displays the webpage for content selection on the display unit 50 with the browser, etc. When the viewer selects any of the content on the webpage for content selection (S10), the terminal control unit 52, using the application program, displays the content-viewing interface 100 on the display unit 50.

The terminal control unit 52 sends to the content delivery server 1 the request for viewing the content (S11). Upon receiving the request for viewing, the content delivery server 1 executes streaming delivery of the selected content to the terminal device 5 (S12).

The terminal control unit 52, using the application program, displays the received content on the content-viewing interface 100 (S13). Consequently, the viewers can view the content on the terminal device 5.

FIG. 10 is a flowchart of the display processing on the terminal device 5. The display processing shown in FIG. 10 is executed with the predetermined time interval. As shown in FIG. 10, the terminal control unit 52 that functions as the content display unit on the terminal device 5 displays the content delivered as streaming on the content display area 110 of the content-viewing interface 100 (FIG. 10: S40). The processing of Step S40 in FIG. 10 corresponds to the processing of Step S9 and Step S10 in FIG. 9.

Next, the terminal control unit 52 that functions as the access status display unit in the terminal device 5 displays, as the access status, the elapsed time on the elapsed-time display area 60 and the number of viewers on the number of viewers display area 131 of the content-viewing interface 100 according to the elapsed time and the number of viewers sent from the content delivery server 1 (FIG. 10: S41). The processing of Step S41 in FIG. 10 corresponds to the processing of Step S9 and Step S10 in FIG. 9. Details of Steps S42 and subsequent processing in FIG. 10 are discussed later.

Getting back to FIG. 9, explanations on processing of the virtual processing server 3 are given hereafter. The virtual processing server 3 performs inquiries to the content delivery server 1 for each of the content on the elapsed time since the start of delivery, the number of viewers and the degree of change in at least one of the image and the sound of the content (S14). Upon receiving the inquiry, the content delivery server 1 sends replies to the virtual processing server 3 on the elapsed time, the number of viewers and the degree of change for each of the content (S15).

Additionally, the virtual processing server 3 performs inquiries to the comment delivery server 2 on the number of comment posts for each of the content (S16). Upon receiving the inquiry, the comment delivery server 2 sends replies to the virtual processing server 3 on the number of comment posts for each of the content.

In this embodiment, the elapsed time, the number of the users, the degree of change and the number of comment posts are all taken as the degree of involvement of the users in the content. Such users include the viewer who accessed to the content and the distributor who delivers the content. It is defined as the first condition for the virtual processing server 3 to access to the content that the degree of the involvement is equal to or less than the predetermined value. The degree of involvement may be all of the elapsed time, the number of viewers, the degree of change and the number of comment posts. Alternatively, it may be any one of the information above, or it may be some combination of any of the above pieces of information.

If the degree of involvement is equal or less than the predetermined value, in other words, when the elapsed time since the start of content delivery is short, when the number of viewers is small, when the degree of change in the image and the sound of the content is small, or when the number of comment posts is small, it is so considered that the content is lacking liveliness. Thus, in this embodiment the virtual processing server 3 executes access in order to liven up the content. When the virtual processing control unit 31 of the virtual processing server 3 determines that the first condition is satisfied such that the degree of involvement is equal or less than the predetermined value, the virtual processing control unit 31 sends to the content delivery server 1 the access command for making access to the content in which the first condition is satisfied (S19).

Upon receiving the access command, the content delivery server 1 sends a notice showing that there has been access from the virtual processing server 3 to the terminal device 5 of the distributor of the content which is now the target of the access command, and to the terminal device 5 of the viewers of the content (S20, S22).

Upon receiving the notice, the terminal device 5 displays the content-viewing interface 100 in a distinguishable manner that access has been executed by the virtual processing server 3 from that access has been executed by the viewers (S21, S23).

As shown in FIG. 10, the terminal control unit 52, which functions as the access status display unit in the terminal device 5, determines whether the access command from the virtual processing server 3 has been sent (FIG. 10: S42), and when the access command from the virtual processing server 3 has been sent (FIG. 10: S42; YES), it performs processing to display the appearance of the virtual processing server 3 (FIG. 10: S43). The appearance display processing of Step S43 in FIG. 10 corresponds to Step S21 and Step S23 in FIG. 9.

For example, as shown in FIG. 7, the terminal control unit 52 displays "BOT has come on stage!!" on the comment display area for the operator 105 of the content-viewing interface 100. BOT is the word originated from "robot," and it generally refers to the automatic uttering system by a machine. In this embodiment, as an example, the virtual processing server 3 is named BOT, and the terminal control unit 52 displays in a distinguishable manner that the virtual processing server 3 has turned up or appeared in the content from the fact that there was access by a viewer and a distributor.

Additionally, in this embodiment, as an example, when there was access from the virtual processing server 3, the terminal control unit 52, which functions as the access status display unit, increments the number of viewers displayed on the number of viewers display area 131 in the content-viewing interface 100. Details of Steps S44 and subsequent processing in FIG. 10 are discussed later.

Now we get back to the explanations of FIG. 9. After executing access to the content as explained above, for example after the predetermined time elapsed, the virtual processing server 3 again performs inquiries to the content delivery server 1 for each of the content about the degree of involvement, in other words, the elapsed time since the start of delivery, the number of viewers and the degree of change of at least one of the image and the sound of the content (S24). Upon receiving the inquiry, the content delivery server 1 sends replies to the virtual processing server 3 on the elapsed time, the number of viewers and the degree of change for each of the content (S25).

Additionally, the virtual processing server 3 performs inquiry to the comment delivery server 2 about the number of comment posts for each of the content (S26). The comment delivery server 2, which has received the inquiry, sends replies to the virtual processing server 3 on the number of comment posts for each of the content (S27).

When the predetermined time has elapsed from the time the virtual processing server 3 accessed to the content, and the degree of involvement is equal to or less than the predetermined value, it is considered that the content is not so lively. Thus, in this embodiment the virtual processing server 3 virtually performs processing of the comment posting in order to liven up the content. "Virtually" means that posting processing is executed by the virtual processing server 3, which is equivalent to the posting processing by actual users who are the distributor and viewer. When it is determined that the second condition is satisfied and that the degree of involvement is equal to or less than the predetermined value based on the answers received from the content delivery server 1 and the comment delivery server 2, the virtual processing control unit 31 of the virtual processing server 3 virtually performs comment posting processing to the content of which the second condition is satisfied (S29). "Virtually" means that the posting processing is not performed by actual users who are the distributor and viewer, but that the posting processing is executed based on the command from the virtual processing server 3. If there is a plurality of target content, comment IDs are stored in a stack, for example, and are processed sequentially. The virtual processing control unit 31 sends the command for performing posting of the comment to the comment delivery server 2 together with the content ID of the content of which the second condition is satisfied (S30).

The second condition may be same as the first condition or may be different from the first condition. For example, the degree of involvement that is not the target in the determination of the first condition may be determined as a target in the second condition. Alternatively, if the elapsed time is adopted as the degree of involvement for the second condition, the elapsed time since the start of content delivery may be adopted or the elapsed time from the predetermined reference time after the start of content delivery may be adopted. The "predetermined reference time," for example, can be set after a minute has elapsed since the start of content delivery.

Upon receiving the command sent from the virtual processing server 3, the comment delivery server 2 performs the processing for creating the comment based on the command (S31). The processing for creating the comment may be of selecting from prefixed phrases or, for example, creating a comment with the use of artificial intelligence.

When a viewer or a distributor posts a comment while viewing the content, the viewer enters comments in the comment input field 70 of the content-viewing interface 100 and clicks the post button 71 (S31). When the post button 71 is clicked, the terminal device 5, using the application program, sends the text data of the comment, the user ID and the content ID to the comment delivery server 2 (S31).

The terminal control unit 52 of the terminal device 5 sends an inquiry to the comment delivery server 2 on whether a comment has been posted to the content of the viewing target at every predetermined time (S32, S33).

Upon receiving the inquiry, the comment delivery server 2 determines whether a comment has been posted to the inquired content, and if the comment has been posted, it performs delivery processing of the comment (S34). The comment delivery server 2 delivers the content ID, the comment, the user ID of the user who posted the comment to the terminal device 5 which made the inquiry (S35, S37). If the comment posting is based on the command sent from the virtual processing server 3, the comment delivery server 2 delivers the information that indicates the virtual processing server 3 instead of the user ID.

Upon receiving the content ID, the comment and the user ID of the user who posted the comment from the comment delivery server 2, the terminal control unit 52 of the terminal device 5, displays the comment on the content display area 110 and the comment display field 140 of the content-viewing interface 100 (S36, S38).

As shown in FIG. 10, the terminal control unit 52, which functions as the information display unit in the terminal device 5, determines whether the comment delivered from the comment delivery server 2 is based on the command from the virtual processing server 3 (FIG. 10: S44). When the terminal control unit 52 determines that the comment is not based on the command from the virtual processing server 3 (FIG. 10: S44; NO), the terminal control unit 52 performs display processing of the ordinary comment (FIG. 10: S45). However, when the terminal control unit 52 determines that the comment is based on the command from the virtual processing server 3 (FIG. 10: S44; YES), it performs display processing of the BOT comment (FIG. 10: S46). The processing of Step S44, Step S45 and Step 46 in FIG. 10 corresponds to Step S36 and Step S38 in FIG. 9.

FIG. 8 is a diagram that shows an example of display by the display processing of BOT comment. BOT comment is a comment based on the command from the virtual processing server 3. In the example shown in FIG. 8, the terminal control unit 52 displays a comment 151 "Hold on" on the content display area 110 as the BOT comment (FIG. 10: S46). The terminal control unit 52 displays a comment 152 "Hold on" on the comment display field 140 in the same way. In order to distinguish between the comment created based on the command from the virtual processing server 3 and the comment by an ordinary viewer or a distributor, outline characters are used in the example shown in FIG. 8. When it is determined that an ordinary comment has been posted by a viewer or a distributor (FIG. 10: S44; NO), the terminal control unit 52, which functions as the information display unit displays characters, for example, in black on the content-display area 110 as the ordinary comment display processing (FIG. 10: S44).

The comment displayed on the comment display field 140 is displayed as it moves at a constant speed into the −X direction as shown in FIG. 6. The location along the direction of the Y axis can be set by the viewer or the distributor who posted the comment. The location along the direction of the Y axis where the comment is displayed, which comment was created based on the command from the virtual processing server 3, may be set by the terminal control unit 52.

It may be configured in such a way that the comment which was created based on the command from the virtual processing server 3, not only a piece of comment but plural pieces of comments, to be posted with a random time interval.

By performing the processing as described above, even in the program which has a few or no viewers, or which has a few or no comments posted because the content delivery has just been started, the fact that there was access from the virtual processing server 3 is displayed in a distinguishable manner from the fact that there was access by actual viewers, therefore it is possible to increase the probability that the content is enlivened. The access from the virtual processing server 3 is executed when the first condition is satisfied in the content as described above. Additionally, when there is a plurality of content for which the first condition is satisfied, the access from the virtual processing server 3 is executed sequentially. Therefore, from a viewpoint of the actual users, it is difficult to anticipate the timing at which access is made from the virtual processing server 3, and the fact that access is made by the virtual processing server 3 becomes a rarity in itself. Thus, it is conceivable that the users' interest is piqued. Consequently, as the access is executed from the virtual processing server 3, the probability is enhanced for the content to be enlivened. Additionally, motivation of the distributor can be improved for continuing the delivery of the content. Furthermore, as described above, the degree of change in the image or the sound of the content is also included in the degree of involvement that is determined as the first condition. Therefore, even the distributor who has not so positively delivered content is expected to positively deliver content because the content is enlivened by the access executed by the virtual processing server 3.

Additionally, by performing the processing as described above, even in the program which has a few or no viewers, or which has a few or no comments posted because the content delivery has just been started, the probability can be enhanced for the content to be enlivened because a BOT comment is displayed in a distinguishable manner from the fact that there was access by actual users. The BOT comment, which is the comment based on the command from the virtual processing server 3 as described above, is executed when the second condition was satisfied in the content. Additionally, when there are plural pieces of content of which the second condition is satisfied, the posting of the BOT comment is executed sequentially. Therefore, from a viewpoint of the actual users, it is difficult to anticipate the timing at which a BOT comment is posted, and the fact that a BOT comment is posted becomes a rarity in itself. Thus, it is conceivable that the users' interest is piqued. Additionally, what kind of BOT comment is posted may intrigue the users' interest. Consequently, with the BOT comment posting being executed, the probability is enhanced for the content to be enlivened. Furthermore, motivation of the distributor can be improved for continuing the delivery of the content. Additionally, as described above, the degree of change in the image or the sound of the content is included in the degree of involvement that is determined as the second condition. Therefore, even the distributor who has not so positively delivered content is expected to positively deliver content because the content is enlivened by posting of BOT comment being executed.

Furthermore, there are cases where viewers refer to whether a number of comments are attached as the criterion for selecting the content. Thus, the viewer selects the content because the BOT comment is displayed, and the probability is enhanced for the content can be enlivened.

Variations

The embodiments above are examples and numerous variations are possible without deviating from the scope of the present invention. In the embodiments described above, such an aspect was explained in that the first and second conditions are determined at separate timings, but the present invention is not limited to this aspect. It can be configured in such a way that the first and second conditions are identical condition and determined at the same timing.

Additionally, in the embodiments and variations described above, such an aspect was explained that the fact that there was access from the virtual processing server 3 and a BOT comment was posted are displayed on the content-viewing interface 100. However, the present invention is not limited to this aspect. It can be configured to notify on the webpage for content selection that the fact there was access from the virtual processing server 3 and that a BOT comment was posted. By doing this, there is the possibility that the viewer who is undecided about which content to select becomes interested, and that the content is enlivened, when the viewer selects to view the content that had access from the virtual processing server 3 or the content to which a BOT comment was posted.

In the above-described embodiment, explanations were given about an example of the use of the comment of the text data as the information of the user posting. However, the present invention is not limited to such an example as this. For instance, when stamps, link information, sound data, images, etc., are used as the information of the user posting, it is possible to perform the same processing as in each of the embodiments described above.

In the above-described embodiments, explanations were given for the aspect in which the content delivery server 1, the comment delivery server 2 and the virtual processing server 3 are configured as physically distinct servers. However, the present invention is not limited to this aspect. It is possible to configure all of these servers as one server or to configure any two kinds of servers as one server.

In the above-described embodiment, explanations were given about the aspect in which comment posting is virtually executed as the virtual processing by the virtual processing server 3. However, the present invention is not limited to this aspect, and it can be configured to execute some events by command from the virtual processing server 3. For example, as an event, it is conceivable to reproduce music by the content delivery server 1, or to send questionnaire, etc. If such processing is performed, it is expected that the content is enlivened.

In the above-described embodiment, explanations were given about the aspect in which the degree of involvement of the distributor or the viewer in the content is used as the first and second conditions. However, the present invention is not limited to this aspect, and it is possible to use a tag attached to the content as the first and second conditions. For example, it can be configured to determine that the first and second conditions are satisfied when such a tag as "#BOT" is attached. Alternatively, it can be configured to place ranking on the users, and determine that the first and second conditions are satisfied, when the content is [posted] by the user who bought a certain amount of points, etc.

The program of each of the servers and the application program of the terminal device 5, which are relevant to the above-described aspects, can be stored in a recording medium readable by a computer and provided to users, then the user can install the programs on a computer. The recording medium can be, for example, a non-transitory recording medium, and an optical recording medium such as CD-ROM is a good example. The recording medium can also include any of various well-known formats such as a semiconductor recording medium, a magnetic recording medium, etc. Additionally, the program can be offered through delivery via a communication network and installed in a computer.

Explanations were given about the application program, the terminal device control method, the terminal device and the servers that are relevant to the embodiments of the present invention. However, the present invention is not limited to these. Numerous variations are possible within the scope of the present invention in such a way that they do not deviate from the key points of the present invention.

INDUSTRIAL APPLICABILITY

The present invention is applicable to the field of video delivery services.

DESCRIPTION OF REFERENCE SIGNS

1 Content delivery server
2 Comment delivery server
3 Virtual processing server
31 Virtual processing control unit
4 Network
5 Terminal device
11 Content delivery control unit
52 Terminal control unit

The invention claimed is:

1. A virtual processing server in a content delivery system comprising a content delivery server configured to provide a delivery service of content to a terminal device, a comment delivery server configured to deliver comments posted on the content, and a virtual processing server configured to virtually execute processing the content, the virtual processing server comprising a processor configured to:
   execute an access to the content and virtually execute processing;
   determine a predetermined first condition for executing the access; and
   virtually execute either virtually posting of a comment on the content, virtually initiating a predetermined event in the content or both as the processing, and
   wherein when the predetermined first condition is determined as satisfied, the processor is configured to virtually initiate the predetermined event in the content as the processing.

2. The virtual processing server according to claim 1, wherein the processor is configured to execute the access to the content by sending a predetermined command to the content delivery server.

3. The virtual processing server according to claim 1, wherein the processor is further configured to determine a predetermined second condition for executing the processing, and
   wherein when the predetermined second condition is determined as satisfied, the processor is configured to execute the processing of virtually posting the comment on the content.

4. The virtual processing server according to claim 3, wherein when the processor executes the processing of virtually posting the comment on the content, the processor is configured to execute virtual processing of comment posting on the content by sending a predetermined command to the comment delivery server, and
   when the processor executes the processing of virtually initiating the predetermined event in the content, the processor is configured to virtually initiate the predetermined event in the content by sending another predetermined command to the content delivery server.

5. The virtual processing server according to claim 3, wherein
   the predetermined first condition and the predetermined second condition at least include a degree of involvement in the content by a distributor of the content or a user who accessed the content being equal to or less than a predetermined value.

6. The virtual processing server according to claim 5, wherein the degree of involvement includes at least any one of: a degree of change in at least one of an image and sound of the content;
a number of viewers of the content; a number of the comment posts on the content; or
an elapsed time from a predetermined reference time.

7. The virtual processing server of claim 1, wherein when the processor virtually executes virtually posting of the comment on the content, the virtual processing server is configured to send a command for performing posting of the comment together with an identifier of the content to the comment delivery server.

8. A control method for a virtual processing server in a content delivery system comprising a content delivery server which provides a delivery service of content to a terminal device, a comment delivery server which delivers comments posted on the content, and the virtual processing server which virtually executes processing the content, the method comprising:
   determining a predetermined first condition for executing an access to the content;
   executing the access to the content when the predetermined first condition is determined as satisfied; and
   virtually executing either virtually posting of a comment on the content, virtually initiating a predetermined event in the content or both as the processing,
   wherein when the predetermined first condition is determined as satisfied, virtually initiating the predetermined event in the content.

9. The method of claim 8, the method further comprising:
   sending a command for performing posting of the comment together with an identifier of the content to the comment delivery server.

10. The control method of claim 8, further comprising:
    determining a predetermined second condition for executing the processing;
    wherein when the predetermined second condition is determined as satisfied, virtually posting the comment on the content.

11. The control method of claim 10, wherein virtually posting the comment on the content comprises sending a predetermined command to the comment delivery server, and
    wherein virtually initiating the predetermined event in the content comprises sending another predetermined command to the content delivery server.

12. The control method of claim 10, wherein the predetermined first condition and the predetermined second condition at least include a degree of involvement in the content by a distributor of the content or a user who accessed the content being equal to or less than a predetermined value.

13. The control method of claim 12, wherein the degree of involvement comprises at least any one of:
    a degree of change in at least one of an image or sound of the content;
    a number of viewers of the content; a number of the comment posts on the content; or
    an elapsed time from a predetermined reference time.

14. A content delivery system, comprising:
    a terminal device configured to provide content or for viewing the content;
    a content delivery server configured to provide a content delivery service to the terminal device;
    a comment delivery server configured to deliver comments posted on the content; and
    a virtual processing server configured to virtually execute processing the content,
    wherein the virtual processing server comprises a processor configured to:
       execute an access to the content and virtually executes processing;
       determine a predetermined first condition for executing the access; and
       virtually execute either virtually posting of a comment on the content, virtually initiating a predetermined event in the content or both as the processing,
    wherein the terminal device comprises a controller configured to:
       display the content;
       display an access status to the content; and
       display the posted comments on the content,
    wherein the controller is configured to display the access executed by the virtual processing server in a distinguishable manner from an access executed by a viewer of the content; and
    the controller is configured to display posts of the comments by the virtual processing server in a distinguishable manner from other posts,
    wherein when the predetermined first condition is determined as satisfied, the processor is configured to virtually initiate the predetermined event in the content as the processing.

15. The content delivery system of claim 14, wherein when the processor virtually executes virtually posting of the comment on the content, the processor is configured to send a command for performing posting of the comment together with an identifier of the content to the comment delivery server.

16. The content delivery system of claim 14, wherein the processor is further configured to determine a predetermined second condition for executing the processing, and
    wherein when the predetermined second condition is determined as satisfied, the processor is configured to execute virtually posting the comment on the content as the processing.

17. The content delivery system of claim 16, wherein when the processor executes the processing of virtually posting the comment on the content, the processor is configured to execute virtual processing of comment posting on the content by sending a predetermined command to the comment delivery server, and
    when the processor executes the processing of virtually initiating the predetermined event in the content, the processor is configured to virtually initiate the predetermined event in the content by sending another predetermined command to the content delivery server.

18. The content delivery system of claim 16, wherein the predetermined first condition and the predetermined second condition at least include a degree of involvement in the content by a distributor of the content or a user who accessed the content being equal to or less than a predetermined value.

19. The content delivery system of claim 18, wherein the degree of involvement includes at least any one of:
    a degree of change in at least one of an image or sound of the content;
    a number of viewers of the content; a number of the comment posts on the content; or
    an elapsed time from a predetermined reference time.

* * * * *